Figure 1:
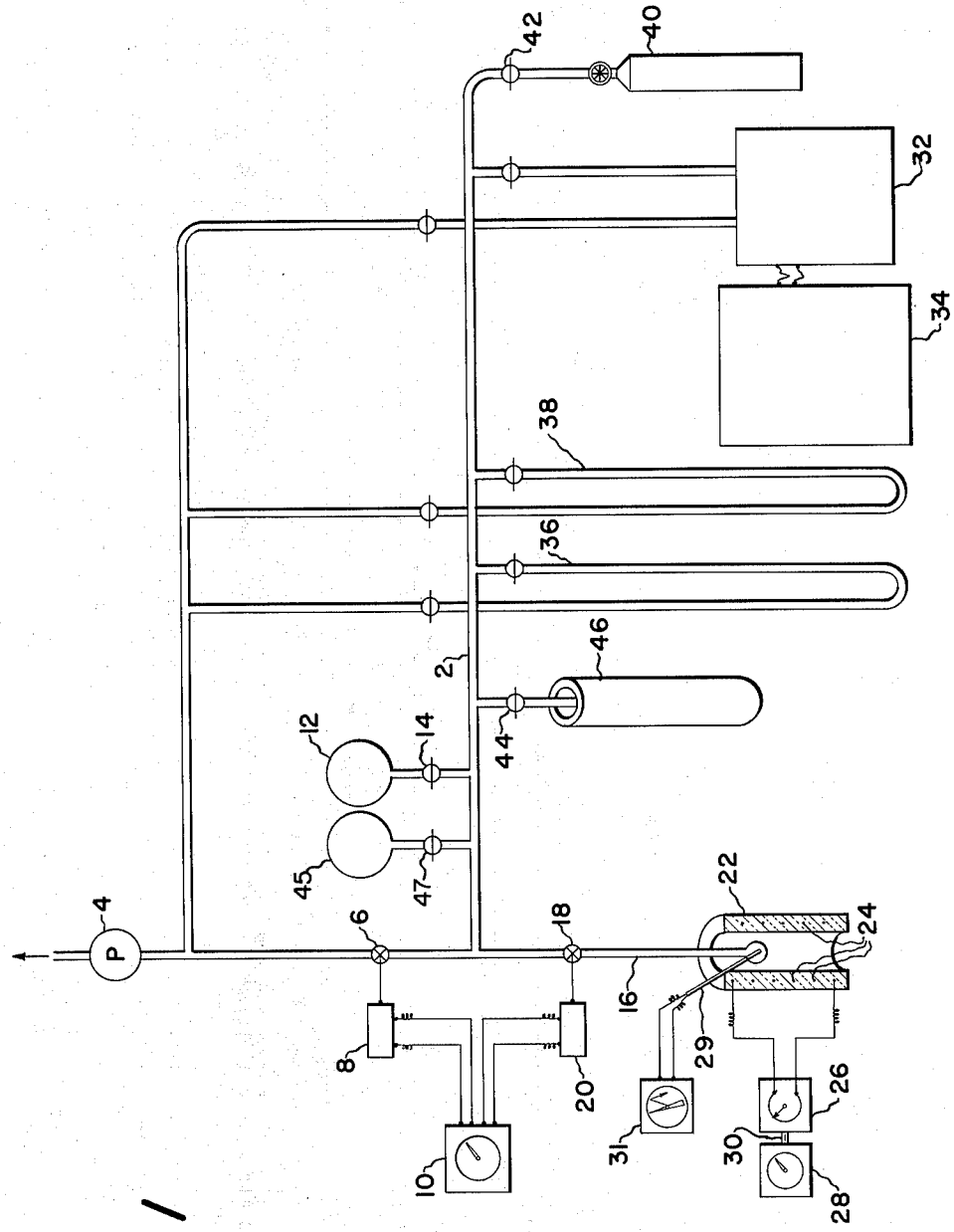

Dec. 7, 1965        E. V. BALLOU ETAL        3,222,133
      METHOD AND APPARATUS FOR DETERMINING SURFACE
                NEUTRALIZABILITY OF SOLID MATERIALS
Filed Nov. 28, 1961                             3 Sheets-Sheet 1

INVENTORS
EDWARD V. BALLOU
RALPH T. BARTH
BY

ATTORNEY

United States Patent Office

3,222,133
Patented Dec. 7, 1965

3,222,133
METHOD AND APPARATUS FOR DETERMINING SURFACE NEUTRALIZABILITY OF SOLID MATERIALS
Edward V. Ballou, Palo Alto, Calif., and Ralph T. Barth, Penn Hills Township, Allegheny County, Pa., assignors to Gulf Research & Development Company, Pittsburgh, Pa., a corporation of Delaware
Filed Nov. 28, 1961, Ser. No. 155,418
12 Claims. (Cl. 23—230)

This invention relates to a method and apparatus for determining the surface neutralizability of solid materials by desorption of chemisorbed, gaseous neutralizing agent; and particularly to a method and apparatus for determining surface acidity of solid catalysts and the like at various temperatures by desorption of chemisorbed ammonia gas into a closed system.

It is now generally accepted by authorities on catalysis that some solid catalysts possess acidic properties in the solid state, as evidenced, for example, by their ability to react with bases to form salt-like compounds, and as evidenced by their ability to change the color of an appropriate indicator. The acidic properties of such catalysts are attributed to the occasional occurrence of acid sites formed by hydrogen ions or protons in the crystalline structure of the individual catalyst particles, or in some cases, to acid sites formed by certain metal ions in the crystalline catalyst structure. It has been theorized that the acid sites on the surfaces of solid catalysts used in certain catalytic refining processes for petroleum hydrocarbons, for example, catalytic cracking, isomerization, alkylation, refining, and hydrocracking, participate in the catalytic mechanism by interacting with hydrocarbons contacted therewith to form activated intermediate carbonium ions that are capable of proceeding along a given reaction path to form a given product or products.

In view of the influence of surface acidity upon catalytic activity and selectivity, it is often important for purposes of control to determine the surface acidity of individual lots of catalysts at various temperatures to which the catalyst may be subjected during use. Various analytical methods have been proposed for the purpose, including, for example, titration with an amine, and desorption of an amine coupled with measurement of heat of immersion. Still another previously proposed analytical method has involved desorption of ammonia gas at elevated temperatures into a continuously evacuated system, with condensation and measurement of ammonia desorbed into the system. While these previously proposed methods can provide useful indices of catalyst surface acidity, they are not entirely satisfactory in that they are rather lengthy and in that they require the relative constant attendance of an operator, and therefore cannot readily be adapted to continuous automatic operation.

The present invention relates to a novel analytical method and apparatus for measuring the surface neutralizability of solid materials at various temperatures based on the principle of desorption of ammonio gas into an evacuated, closed system, whereby at least the more time-consuming steps of the analytical procedure can be carried out continuously and automatically without the attendance of an operator. The apparatus of the present invention includes a vacuum manifold, means associated therewith for evacuating said manifold, valve means for closing off said manifold from said evacuating means during adsorption and desorption of neutralizing agent by the sample of solid material, a gas container vessel connected to said manifold for containing a charge of gaseous neutralizing agent for said solid material, valve means for controlling flow between said container vessel and said manifold, a sample container connected to said manifold and adapted to contain a sample of the solid material whose surface neutralizability is to be determined, valve means for controlling flow between the manifold and the sample container, variable heating means for heating the contents of the sample container to pre-selected temperatures, and means connected with said manifold for measuring the gas pressure in the manifold.

In accordance with the method of this invention, the surface neutralizability of a solid material is determined by a sequence including the preliminary step of contacting a measured sample of the solid material in a closed system with a measured amount of a neutralizing agent that is gaseous at the conditions of contacting and that is effective to neutralize at least a portion of the neutralizable sites on the surfaces of the solid material. The invention is especially useful for determining the surface acidity of solid catalytic materials such as silica-alumina, alumina, and the like. However, it is not limited thereto and can be used in measuring the surface acidity or basicity of other catalytic or non-catalytic material, for example, ion exchange resins. Ammonia gas is the preferred gaseous neutralizing agent for measurement of surface acidity of catalysts, but other gaseous neutralizing agents can be used. For example, other alkaline or basic gases such as phosphine, and arsine can be used to determine surface acidity, and acidic gases such as hydrogen chloride gas can be used to determine surface basicity. The neutralizing agent is utilized in excess, preferably in small excess, of the amount required to neutralize the neutralizable sites at the lowest temperature at which surface neutralizability is to be measured, so that a measurable gas pressure will exist in the closed system at all times. We prefer that the excess of neutralizing agent employed be not very large, since the amount of unadsorbed neutralizing agent in the system can affect the equilibrium adsorption point. After the above-described contacting of neutralizing agent and solid material is completed and equilibrium has been reached, the sample is subjected to a temperature at which the surface neutralizability is to be measured, and the gas pressure of the system is measured at equilibrium. The system gas pressure thus measured is indicative of the amount of neutralizing agent that is not adsorbed by the sample at the conditions existing in the system. This amount, in turn, is indicative of the amount of neutralizing agent adsorbed by the sample at the same conditions. The amount of neutralizing agent adsorbed is indicative of the surface neutralizability of the solid material at these conditions.

In determining the amount of neutralizing agent adsorbed at a given temperature, after contacting of the solid material and neutralizing agent is completed, we prefer to isolate the sample of solid material from the balance of the closed system, and to evacuate the system to remove unadsorbed gas; the sample is then subjected to reduced pressure in the evacuated closed system at the same temperature at which the contacting was carried out, in order to release into the system any neutralizing agent in excess of the amount that is adsorbable by the sample at the reduced pressure of the system, and the gas pressure of the system is again measured at equilibrium to provide an indication of the amount of neutralizing agent that still remains adsorbed by the sample of solid material. This procedure is preferred, as it minimizes the back pressure of unadsorbed neutralizing agent. In principle, this preferred procedure is not adsolutely necessary, and if desired, the isolation, evacuation and preliminary desorption just described can be eliminated, albeit at the cost of a somewhat greater difference between the observed absorptivities and those theoretically obtainable.

When the surface neutralizability of the solid material is to be obtained at more than one temperature, the sample referred to above is further subjected to a different temperature at which the property is to be measured. For greatest accuracy, it is preferred that the surface neutralizability of the sample be determined at a number of temperatures in the desired range, but this is not absolutely necessary. In measuring surface neutralizability at another temperature, we normally prefer to subject the sample of solid material in the closed system to a higher temperature at which the surface neutralizability is to be measured, in order to desorb a portion of the remaining adsorbed neutralizing agent, following which the gas pressure of the system is again measured at equilibrium to obtain an indication of the amount of neutralizing agent remaining adsorbed at the higher temperature. Although we prefer to heat the sample to a higher temperature as described in the interest of facilitating temperature control, this is not absolutely essential, as the adsorption-desorption cycle has been found to be entirely reversible. Consequently, if desired, the change in the gas pressure of the system can be measured after cooling the sample to a lower temperature, rather than after heating it to a higher temperature.

Figure 2:
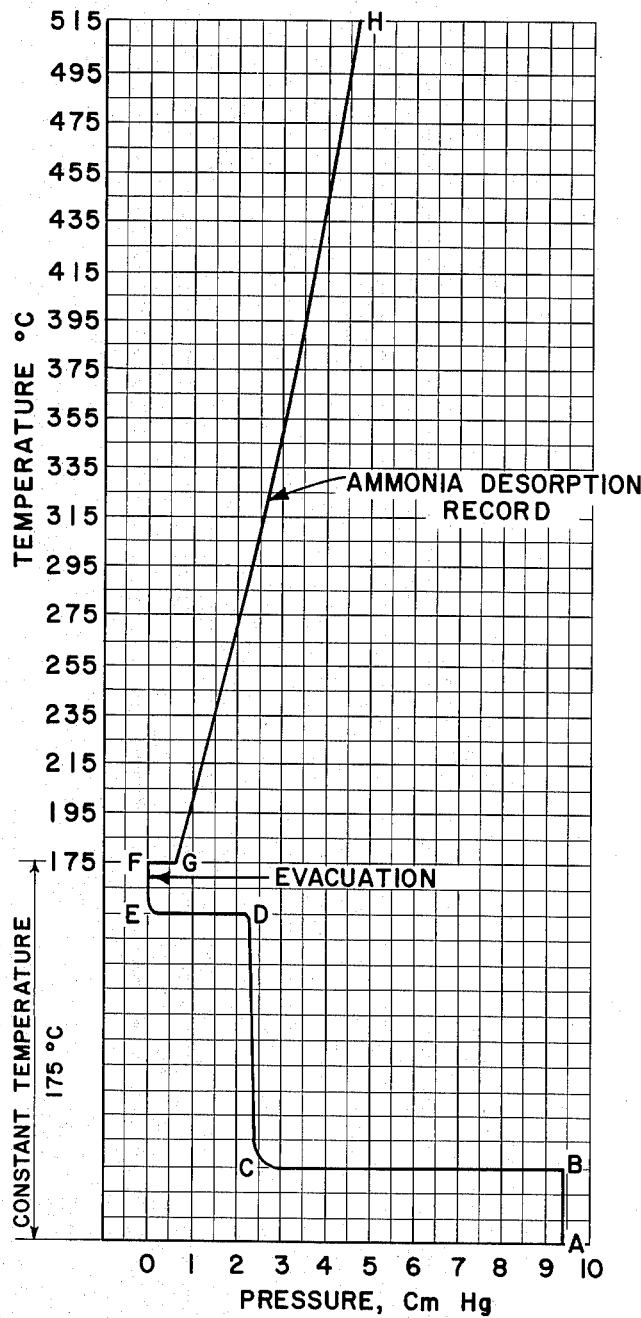
Figure 3:
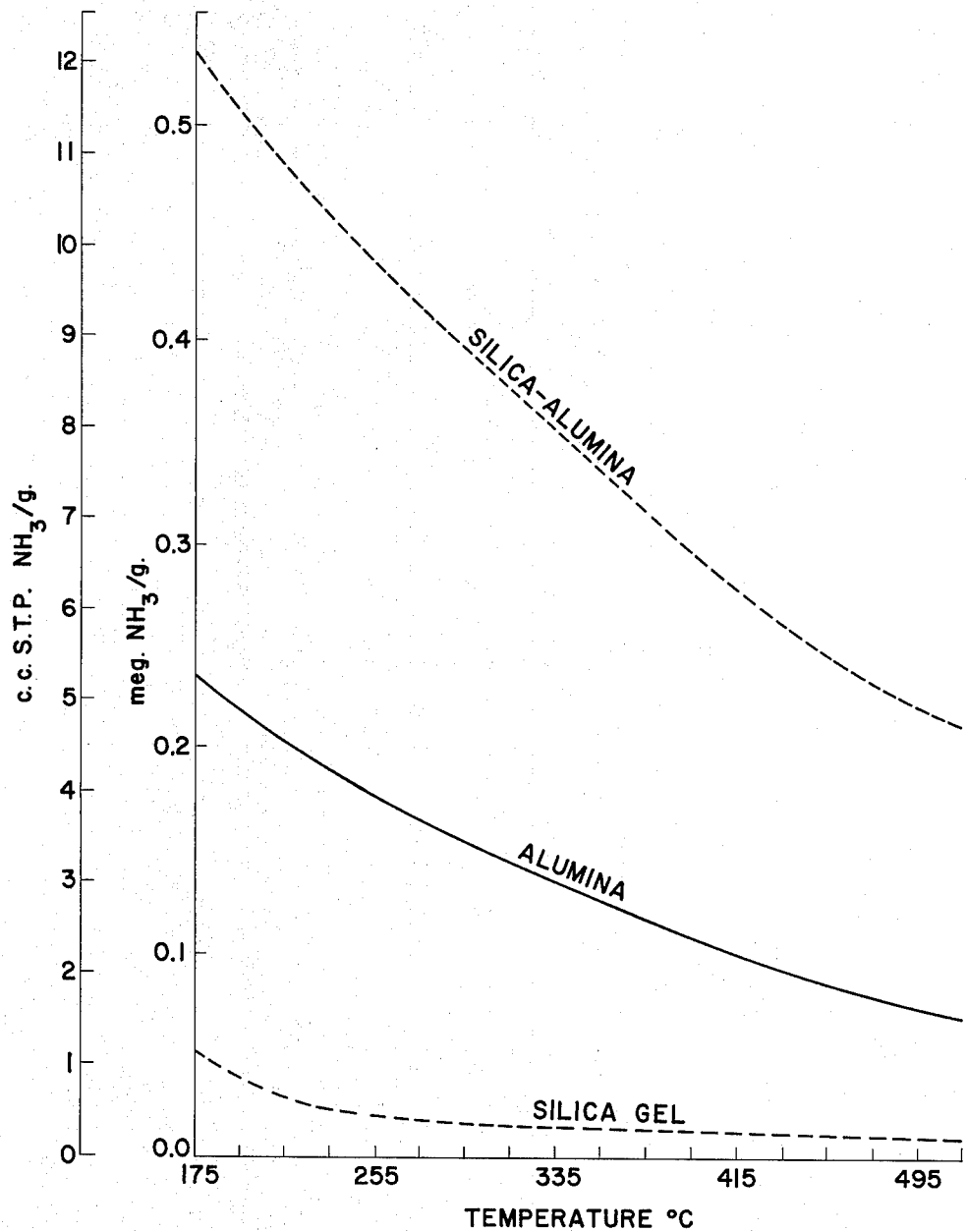

Referring briefly to the drawings, FIGURE 1 is a schematic representation of a suitable apparatus for measuring surface neutralizability. FIGURE 2 is a reproduction of a recording chart of the gas pressure in the system shown in FIGURE 1 during the various stages of the process. FIGURE 3 is a plot of the surface acidity of several solid materials, expressed as milli-equivalents of adsorbed ammonia per gram of solid material, at temperatures ranging from 175° C. to 515° C., obtained in accordance with this invention.

Referring now to FIGURE 1 in greater detail, numeral 2 designates a vacuum manifold connecting the functioning elements of the apparatus. Numeral 4 designates vacuum pump means associated with manifold 2 for evacuating the latter, and numeral 6 denotes valve means for controlling flow between manifold 2 and evacuating means 4. Numeral 8 designates solenoid valve control means for opening and closing valve means 6. Control means 8 is in turn operated by a cam-operated switch or the like, not shown. Motor-driven timer 10 operates the cam. Timer 10 and solenoid 8 constitute control means for closing valve means 6 during adsorption and desorption of gaseous neutralizing agent by the sample of solid material whose surface neutralizability is to be measured, and for opening such valve means during evacuation of the manifold. Numeral 12 refers to a mercury sealed, gas storage vessel connected to manifold 2, the flow therebetween being controlled by valve means 14. Numeral 16 designates a sample container connected to manifold 2 by means of valve 18, which controls flow between manifold 2 and sample vessel 16. Numeral 20 designates solenoid valve control means for controlling valve 18. Solenoid 20 in turn is caused to operate by a cam operated switch, not shown, the cam being driven by timer 10. Solenoid 20, together with timer 10, comprise control means for closing valve means 18 when manifold 2 is being evacuated by pump 4, and for opening valve means 18 when neutralizing agent is being adsorbed or desorbed by the sample of solid material within the sample container 16. Numeral 22 designates an electrical furnace for heating the contents of sample tube 16. More particularly, numeral 24 indicates resistance windings embedded in the insulating housing of heating means 22. Windings 24 are connected to rheostat 26, the resistance of which is varied in a predetermined manner by a motor-driven timer 28 associated therewith through drive shaft 30 and a gear train, not shown. Numeral 29 denotes a thermocouple element inserted in a thermowell, not numbered, in sample container 16. The temperatures sensed by thermocouple 29 are indicated and recorded, if desired, by potentiometer 31. In a practical embodiment, excellent heat control has been obtained by the use of an Amplitrol No. 152 heat controller marketed by the Wheelco Instruments Division of Barber-Coleman Co., Rockford, Ill. The heat controller in turn is driven by a motor operated synchronously with the recorder chart drive of recorder 34. Because of the synchronous operation of the heat control drive means and the recorder chart drive means, the temperature of the sample can be read directly from the chart. Numeral 32 indicates electrical sensing means for continuously measuring the gas pressure in manifold 2, and numeral 34 denotes recording means for continuously recording the gas pressures measured by means 32. In the preferred embodiment we employ a force balance pressure sensing means, as this type of instrument does not effect any change in the volume of the system. Excellent results have been obtained with an electronic differential pressure transmitter, T/613 Electronic D/P cell transmitter, marketed by the Foxboro Co. Inc., Foxboro, Mass. This instrument is described in the Foxboro brochure entitled: "Technical Information," 39–15a, revised May 13, 1960. Numerals 36 and 38 refer, respectively, to oil and mercury manometers for visually checking the pressures measured by the automatic manometer 32.

In a specific instance, ammonia gas to be used in measuring the surface acidity of a solid material is purified by passing ammonia from supply vessel 40 through valve 42, manifold 2 and valve 44 into cold trap 46 where the impure ammonia is condensed to a liquid. With valve 6 open and vacuum pump 4 operating, the liquid ammonia in cold trap 46 is allowed to warm up gradually and impurities are allowed to distill off from the liquid ammonia. When all of the impurities have been removed, valve 6 is closed and valve 14 is opened, and pure ammonia gas is allowed to distill into manifold 2 and gas storage vessel 12 until a suitable gas pressure, for example, approximately 100 mm. Hg, has been reached. This quantity of ammonia gas in gas storage vessel 12 constitutes a single charge to the system.

Before the charge of ammonia gas is introduced into the system, the volume of manifold 2 is determined by expansion of a known volume of an inert gas into the system from vessel 45 by way of valve 47. The volume of the vacuum manifold 2 is determinable by subtraction of the volume of calibration gas at STP remaining in calibration vessel 45 after expansion into vacuum manifold 2 from the volume of gas at STP contained in calibration vessel 45 prior to expansion into manifold 2.

The sample of solid material is also prepared for adsorption prior to introduction of a charge of ammonia gas into the system. In accordance with this preparation, a weighed sample of the solid material whose surface acidity is to be determined is transferred to a previously tared sample vessel 16, and the sample is heated under vacuum—with valves 6 and 18 open—in furnace 22 to a temperature and for a time sufficient to eliminate water and/or adsorbed gases which might affect adsorption and desorption of ammonia gas by the solid material. After heating is complete, valve 18 is closed and sample vessel 16 is reweighed to determine the dry weight of the sample. The sample vessel is then reconnected to the system and the temperature of of furnace 22 is set at the initial temperature at which surface acidity is to be measured, preferably the lowest temperature at which surface acidity is to be measured.

When the sample has reached equilibrium, a charge of ammonia gas is introduced into manifold 2 from gas storage vessel 12 by opening valve 14. At this time valves 42, 44, 47, 6, and 18 are closed. At this time the pressure in the system will be as indicated by the letter A in FIGURE 2. After the pressure in the system has stabilized, valve 14 is closed and automatic operation by timer 10 is commenced with the opening of valve 18 by the action of solenoid 20. At the time when valve 18 is opened, the gas pressure in the system as recorded by recorder 34 is as indicated by the letter B of FIGURE 2. Immediately after valve 18 opens, ammonia gas is adsorbed rapidly by the sample of solid material and a sharp decline in pressure is recorded by recorder 34, as indicated by the line BC in FIGURE 2. Valve 18 is permitted to remain open by timer 10 for a period sufficient for equilibrium to be reached, one hour in FIGURE 2, during which time the gas pressure in the system stabilizes as indicated on the chart of recorder 34 by the line CD in FIGURE 2. When equilibrium has been reached, valve 18 is closed by timer 10 and solenoid 20, and valve 6 is opened by timer 10 and solenoid 8, whereby manifold 2 is evacuated to remove unadsorbed ammonia gas. The decline in pressure encountered during evacuation is indicated on the chart of recorder 34 by the line DEF in FIGURE 2.

When the system has been evacuated to a negligible pressure as indicated on the recorder chart by the line EF in FIGURE 2, valve 6 is closed and valve 18 is opened, through the action of solenoids 8 and 20, respectively, and timer 10. A small but sharp increase in pressure is noted at this time as indicated on the chart of recorder 34 by the line FG in FIGURE 2. This increase in pressure is caused by the release of unadsorbed ammonia gas from sample vessel 16 and by the desorption of the small amount of ammonia gas that was previously adsorbed by the sample of solid material at pressure D in FIGURE 2 that is no longer adsorbable by the sample at lesser pressure G on FIGURE 2 at the same temperature.

After equilibrium has been reached at pressure G indicated in FIGURE 2, motor-driven timer 28 reduces the resistance in rheostat 26 at a predetermined rate so as to advance the temperature of the sample at a corresponding rate in furnace 22. The rate of temperature advancement can be either regular or irregular, as desired, but is such that differential pressure transmitter 32 will have the opportunity to measure equilibrium pressures.

The temperature of the sample is automatically advanced over the entire temperature range desired while the gas pressure in the system is automatically sensed and recorded by differential pressure transmitter 32 and recorder 34. The pressure line GH in FIGURE 2 represents the continuous record of the increase in the gas pressure of the system during this time. From the gas pressure of the system at any temperature within the range measured, one can determine the amount of ammonia gas desorbed, and by the difference between such amount and the amount adsorbed on the catalyst at pressure G one can determine the amount of ammonia gas remaining adsorbed on the catalyst at the temperature in question. The amount of adsorbed ammonia gas, together with the weight of the sample, permits expression of adsorbed ammonia, which is a measure of surface acidity, in cubic centimeters of STP ammonia, or alternatively, in milliequivalents of ammonia, per gram of solid material at any temperature between pressures of G and H indicated in FIGURE 2. In practice, it has been found useful to calculate surface acidity in cubic centimeters of neutralizing agent per gram of solid material at 20 representative temperatures in the range measured and to plot the surface neutralizability for the particular material in question in milliequivalents of neutralizing agent per gram of solid material, against the temperature of measurement as indicated in FIGURE 3. As will be seen from FIGURE 3, silica-alumina was found to have a greater surface acidity than alumina at all temperatures from 175° C. to 515° C. Alumina in turn was found to have greater surface acidity than silica gel at all temperatures measured.

In a particular instance, a one gram sample of a commercial, triple A grade, silica-alumina catalyst is transferred to a tared, borosilicate glass adsorption sample tube having a previously determined volume of 8.6 cc. and containing a thermocouple well. The sample is heated at 500° C. for three hours under vacuum to eliminate water which could desorb under test conditions. The sample is then allowed to cool and is reweighed with the sample vessel stopcock closed. Since only the amount of chemisorbed gas at elevated temperature is desired, the sample is heated to a temperature above the condensation temperature of the condensate, in this instance, 175° C., before exposure to a measured amount of ammonia. With the sample tube closed, the ammonia is introduced into the system—previously determined to contain a volume of 111.78 cc.—at room temperature to a pressure of 94.6 mm. Hg. This corresponds to a charge of 12.75 cc. STP of gas per gram of sample. The sample, at a temperature of 175° C., is exposed to the gas and the decrease in pressure to 19.1 mm. Hg is recorded. This pressure corresponds to 2.77 cc. STP of gas in the system after adsorption. After one hour of adsorption the sample tube is closed and the system is evacuated. After evacuation of the system to a negligible pressure, the sample tube stopcock is reopened, and a system gas pressure of 7.3 mm. Hg is recorded. A volume of 9.12 cc. STP ammonia is calculated to be adsorbed on the sample at this time by subtracting the amount (2.77 cc. STP) of ammonia gas remaining in the system after adsorption is complete and the amount (0.86 cc. STP) of ammonia gas initially desorbed from the sample on subjecting the same to reduced pressure in the evacuated system from the original amount of the charge of ammonia gas to the system. Since a one-gram sample of catalyst was employed at the outset, the surface acidity of the catalyst at 175° C. is equal to 9.12 cc. STP ammonia per gram or 0.47 milliequivalent of ammonia per gram of catalyst at 175° C.

It will be understood that the herein-disclosed invention is not limited to the particular embodiments described above and that other solid materials containing surficial neutralizable sites, other gaseous neutralizing agents, other valve switching and time sequences as disclosed herein can be employed with good results. Also, it will be apparent that only the most time-consuming operations have been automated in the embodiment described herein. If desired, other steps of the process can be automated. For example, introduction of the charge of neutralizing agent can be automated by the use of a motor-driven timer and solenoid control in association with valve 14. Also, if desired, all of the timed operations described can be integrated into a single timing system in conventional manner, and all such operations can be controlled by a single timer.

Numerous variations and modifications of the process and apparatus as herein described will readily occur to those skilled in the art and can be resorted to without departing from the spirit or scope of the present invention. Accordingly, only such limitations should be imposed upon the present invention as are specifically indicated in the claims appended hereto.

We claim:

1. A method for determining the surface neutralizability of a solid material, comprising contacting a measured sample of the solid material in a closed system with a measured amount of a neutralizing agent that is gaseous at the conditions of said contacting and that is effective to neutralize the nuetralizable sites on the surface of said solid material, so as to effect chemisorption of said neutralizing agent by said sample, said neutralizing agent being employed in excess of the amount required to completely neutralize the neutralizable sites at the lowest temperature at which surface neutralizability is to be determined, said contacting being carried out at a temperature above the condensation temperature of said neutralizing agent, subjecting the sample in said closed system to a plurality of temperatures at which surface neutralizability is to be determined and measuring the gas pressure of the system at equilibrium at each such temperature, the gas pressure so measured being indicative of the amount of neutralizing agent that is not chemisorbed by the sample at the conditions of the system, this amount in turn being indicative of the amount of neutralizing agent chemisorbed by the sample at the same conditions, the amount so chemisorbed being indicative of the surface neutralizability of the solid material at these conditions.

2. A method for determining the surface neutralizability of a solid material at a plurality of temperatures, comprising contacting a measured sample of the solid material in a closed system with a measured amount of a neutalizing agent that is gaseous at the conditions of said contacting and that is effective to neutralize the neutralizable sites on the surface of said solid material, so as to effect chemisorption of said neutralizing agent by said sample, said neutralizing agent being employed in excess of the amount required to completely neutralize the neutralizable sites at the lowest temperature at which surface neutralizability is to be determined, said contacting being carried out at a temperature at which the surface neutralizability is to be determined above the condensation temperature of the neutralizing agent, measuring the gas pressure of the system at equilibrium, subjecting the sample in said closed system to a different temperature at which surface neutralizability is to be determined in order to effect a change in the amount of neutralizing agent chemisorbed on the sample and again measuring the gas pressure of the system at equilibrium, the gas pressures so measured being indicative of the amounts of neutralizing agent that are not chemisorbed by the sample at the conditions of the system, these amounts in turn being indicative of the amounts of neutralizing agent chemisorbed by the sample at the same conditions, the amounts so chemisorbed being indicative of the surface neutralizability of the solid material at these conditions.

3. A method for determining the surface acidity of a solid material at a plurality of temperatures, comprising contacting a measured sample of the solid material in a closed system with a measured amount of an alkaline neutralizing agent that is gaseous at the conditions of said contacting and that is effective to neutralize the surface acidity of said solid material so as to effect chemisorption of said alkaline agent by said sample, said alkaline agent being employed in excess of the amount required to completely neutralize the surface acidity at the temperature of contact, said contacting being carried out at a temperature at which the surface acidity is to be determined above the condensation temperature of the alkaline agent, measuring the gas pressure of the system at equilibrium, heating the sample in said closed system to a higher temperature at which surface acidity is to be determined in order to effect a change in the amount of alkaline agent chemisorbed on the sample, and again measuring the gas pressure of the system at equilibrium, the gas pressures so measured being indicative of the amounts of alkaline agent that are not chemisorbed by the sample at the conditions of the system, these amounts in turn being indicative of the amounts of alkaline agent chemisorbed by the sample at the same conditions, the amounts so chemisorbed being indicative of the surface acidity of the solid material at these conditions.

4. A method for determining the surface neutralizability of a solid material at a plurality of temperatures, comprising contacting a measured sample of the solid material in a closed system of known volume with a measured amount of a neutralizing agent that is gaseous at the conditions of said contacting and that is effective to neutralize the neutralizable sites on the surfaces of said solid material, so as to effect chemisorption of said neutralizing agent by said sample, said neutralizing agent being employed in excess of the amount required to completely neutralize said neutralizable sites at the temperature of contact, said contacting being carried out at a temperature at which the surface neutralizability is to be determined above the condensation temperature of the neutralizing agent, measuring the gas pressure of the system at equilibrium, isolating the sample from the balance of the closed system and evacuating the latter to remove unadsorbed neutralizing agent remaining therein, subjecting the sample containing chemisorbed neutralizing agent to reduced pressure in the evacuated closed system at the same temperature at which said contacting was carried out to release into the system neutralizing agent in excess of the amount chemisorbable by the sample at the reduced pressure of the system, measuring the gas pressure of the system at equilibrium, heating the sample in said closed system to a higher temperature at which surface neutralizability is to be determined to desorb a portion of the remaining chemisorbed neutralizing agent, measuring the gas pressure of the system at equilibrium, the gas pressure so measured being indicative of the amounts of neutralizing agent that are not chemisorbed by the sample at the conditions of the system, these amounts in turn being indicative of the amounts of neutralizing agent chemisorbed by the sample at the same conditions, the amounts so chemisorbed being indicative of the surface neutralizability of the solid material at these conditions.

5. A method for determining the surface acidity of a solid material at a plurality of temperatures, comprising contacting a measured sample of the solid material in a closed system of known volume with a measured amount of an alkaline agent that is gaseous at the conditions of said contacting and that is effective to neutralize the surface acidity of said solid material so as to effect chemisorption of said alkaline agent by said sample, said alkaline agent being employed in excess of the amount required to completely neutralize said surface acidity at the temperature of contact, said contacting being carried out at a temperature at which the surface acidity is to be determined above the condensation temperature of the alkaline agent, measuring the gas pressure of the system at equilibrium, isolating the sample from the balance of the closed system and evacuating the latter to remove unadsorbed alkaline agent remaining therein, subjecting the sample containing chemisorbed alkaline agent to reduced pressure in the evacuated closed system at the same temperature at which said contacting was carried out to release into the system alkaline agent in excess of the amount chemisorbable by the sample at the reduced pressure of the system, measuring the gas pressure of the system at equilibrium, heating the sample in said closed system to a higher temperature at which surface acidity is to be determined to desorb a portion of the remaining chemisorbed alkaline agent, measuring the gas pressure of the system at equilibrium, the gas pressure so measured being indicative of the amounts of alkaline agent that are not chemisorbed by the sample at the conditions of the system, these amounts in turn being indicative of the amounts of alkaline agent chemisorbed by the sample at the same conditions, the amounts so chemisorbed being indicative of the surface acidity of the solid material at these conditions.

6. The process of claim 5 where said alkaline agent is ammonia gas.

7. A method for determining the surface acidity of a solid material at a plurality of temperatures, comprising contacting a measured sample of the solid material in a closed system of known volume with a measured amount of gaseous ammonia so as to effect chemisorption of said ammonia by said sample, said ammonia being employed in excess of the amount required to completely neutralize the surface acidity of the sample at the temperature of contact, said contacting being carried out at a temperature at which the surface acidity is to be determined above the condensation temperature of the alkaline agent, continuously measuring and recording the gas pressure of the system until equilibrium is reached, isolating the sample from the balance of the closed system and evacuating the latter to remove unadsorbed ammonia remaining therein, subjecting the sample containing chemisorbed ammonia to reduced pressure in the evacuated closed system at the same temperature at which said contacting was carried out to release into the system ammonia in excess of the amount chemisorbable by the sample at the reduced pressure of the system and continuously measuring and recording the gas pressure of the system until equilibrium is reached, thereafter automatically heating the sample in said closed system to a higher temperature at which surface acidity is to be determined to desorb a portion of the remaining chemisorbed ammonia, and continuously measuring and recording the gas pressure of the system until equilibrium has been reached, the gas pressures so measured being indicative of the amounts of ammonia that are not chemisorbed by the sample at the conditions of the system, these amounts in turn being indicative of the amounts of ammonia chemisorbed by the sample at the same conditions, the amounts so chemisorbed being indicative of the surface acidity of the solid material at these conditions.

8. A method for determining the surface acidity of a solid material at a plurality of temperatures, comprising contacting a measured sample of the solid material in a closed system of known volume with a measured amount of ammonia so as to effect chemisorption of said ammonia by said sample, said ammonia being employed in excess of the amount required to completely neutralize the surface acidity of said sample at the temperature of contact, said contacting being carried out at a temperature at which the surface acidity is to be determined above the condensation temperature of ammonia, said contacting also being carried out until equilibrium is reached, determining the quantity of ammonia remaining in the system unadsorbed by the sample by measuring the gas pressure of the system, isolating the sample from the balance of the closed system and evacuating the latter to remove unadsorbed ammonia remaining therein, subjecting the sample containing chemisorbed ammonia to reduced pressure in the evacuated closed system at the same temperature at which said contacting was carried out to release into the system ammonia in excess of the amount chemisorbable by the sample at the reduced pressure of the system, determining the quantity of ammonia released into said evacuated closed system at equilibrium by measuring the gas pressure of the system, calculating the quantity of ammonia remaining chemisorbed by said sample by subtracting the total of the amount so released and the amount initially unadsorbed by the sample from the measured amount originally introduced into the system, said calculated quantity being indicative of the surface acidity of the solid material at the temperature of the sample, heating the sample in said closed system to a higher temperature at which surface acidity is to be determined to desorb a portion of the remaining chemisorbed ammonia, determining the quantity of ammonia desorbed at such temperature at equilibrium by measuring the increase in the gas pressure of the system, and calculating the quantity of ammonia remaining chemisorbed by the sample by subtracting the amount of desorbed ammonia from the amount previously determined to be chemisorbed on the sample, the quantity so calculated being indicative of the surface acidity of the solid material at that temperature.

9. A method for determining the surface neutralizability of a solid material at a plurality of temperatures, comprising contacting a measured sample of the solid material in a closed system of known volume with a measured amount of a neutralizing agent that is gaseous at the conditions of said contacting and that is effective to neutralize the neutralizable sites on the surfaces of said solid material, so as to effect chemisorption of said neutralizing agent by said sample, said neutralizing agent being employed in excess of the amount required to completely neutralize said neutralizable sites at the temperature of contact, said contacting being carried out at a temperature at which the surface neutralizability is to be determined above the condensation temperature of the neutralizing agent, said contacting also being carried out until equilibrium is reached, isolating the sample from the balance of the closed system and evacuating the latter to remove unadsorbed neutralizing agent remaining therein, subjecting the sample containing chemisorbed neutralizing agent to reduced pressure in the evacuated closed system at the same temperature at which said contacting was carried out to release into the system neutralizing agent in excess of the amount chemisorbable by the sample at the reduced pressure of the system, calculating the quantity of neutralizing agent remaining chemisorbed by said sample, said quantity being indicative of the surface neutralizability of the solid material at the temperature of the sample, heating the sample in said closed system to a higher temperature at which surface neutralizability is to be determined to desorb a portion of the remaining chemisorbed neutralizing agent, and calculating the quantity of neutralizing agent remaining chemisorbed by the sample, such quantity being indicative of the surface neutralizability of the solid material at that temperature.

10. A method for determining the surface acidity of a solid material at a plurality of temperatures, comprising contacting a measured sample of the solid material in a closed system of known volume with a measured amount of an alkaline agent that is gaseous at the conditions of said contacting and that is effective to neutralize the surface acidity of said solid material, so as to effect chemisorption of said neutralizing agent by said sample, said alkaline agent being employed in excess of the amount required to completey neutralize said surface acidity at the temperature of contact, said contacting being carried out at a temperature at which the surface acidity is to be determined above the condensation temperature of the alkaline agent, said contacting also being carried out until equilibrium is reached, isolating the sample from the balance of the closed system and evacuating the latter to remove unadsorbed alkaline agent remaining therein, subjecting the sample containing chemisorbed alkaline agent to reduced pressure in the evacuated closed system at the same temperature at which said contacting was carried out to release into the system neutralizing agent in excess of the amount chemisorbable by the sample at the reduced pressure of the system, calculating the quantity of alkaline agent remaining chemisorbed by said sample, said quantity being indicative of the surface acidity of the solid material at the temperature of the sample, heating the sample in said closed system to a higher temperature at which surface acidity is to be determined to desorb a portion of the remaining chemisorbed alkaline agent, and calculating the quantity of alkaline agent remaining chemisorbed by the sample, such quantity being indicative of the surface acidity of the solid material at that temperature.

11. The process of claim 10 where the alkaline agent is ammonia gas.

12. Apparatus for determining the surface neutralizability of a solid material by adsorption and desorption of a gaseous neutralizing agent in a closed system, comprising a vacuum manifold, means associated therewith for evacuating said manifold, valve means for controlling flow between said manifold and said evacuating means, control means for closing said valve means during adsorption and desorption of neutralizing agent by said solid material and for opening said valve means during evacuation of the manifold, a gas container vessel connected to said manifold for containing a charge of a gaseous neutralizing agent with which the surface neutralizability of the solid material is to be determined, valve means for closing off said container vessel from said manifold when introduction of the gaseous charge into the manifold is complete, a sample container connected to said manifold and adapted to contain a sample of said solid material whose surface neutralizability is to be determined, valve means for closing off said sample container from said manifold, control means for closing said valve means when the manifold is being evacuated and for opening said valve means when neutralizing agent is being adsorbed or desorbed by the sample of solid material, variable heating means for heating the contents of the sample container to a plurality of preselected temperatures in succession, drive means operatively connected with said heating means to advance the temperature of the latter at a predetermined rate, means connected with said manifold for continuously measuring the gas pressure in the manifold, means for continuously recording the gas pressures measured by said measuring means.

References Cited by the Examiner
UNITED STATES PATENTS
2,788,657   4/1957   Innes _____ 73—38

OTHER REFERENCES

Nelsen et al.: article in Analytical Chemistry, vol. 30 (1958), pages 1387–90.

Trapnell: Chemisorption, pp. 254–259, Academic Press Inc., New York, 1955.

MORRIS O. WOLK, *Primary Examiner*.

MAURICE A. BRINDISI, *Examiner*.